July 12, 1960
G. PAMPHILON
2,944,440
SHAFT DRIVE STRUCTURE
Filed Dec. 31, 1956
3 Sheets-Sheet 1
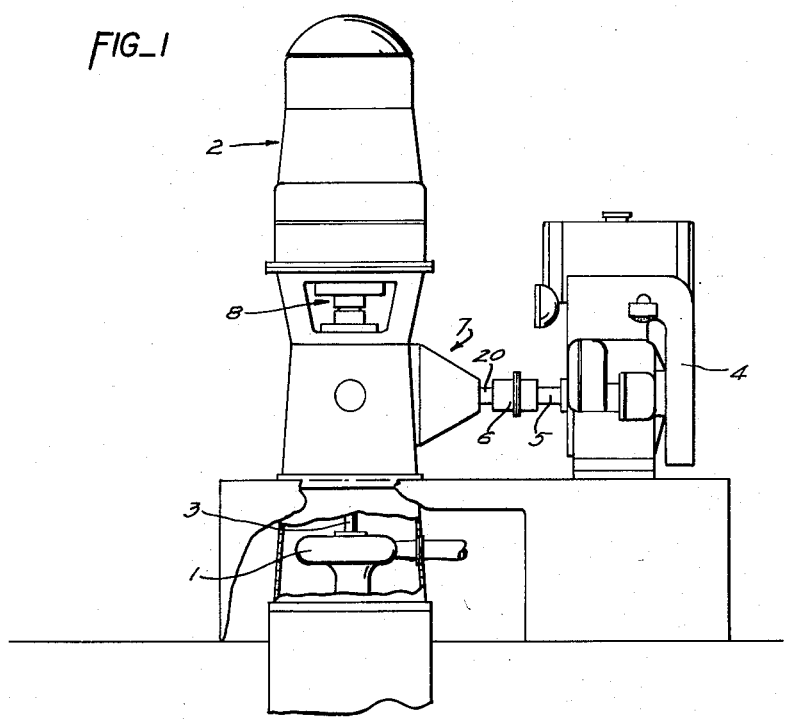
FIG_1
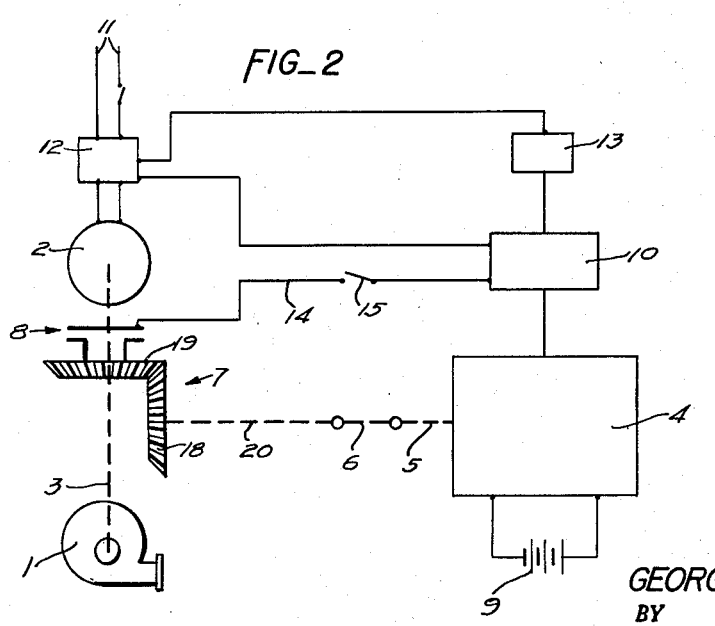
FIG_2
INVENTOR.
GEORGE PAMPHILON
BY
Boyken, Mohler & Wood

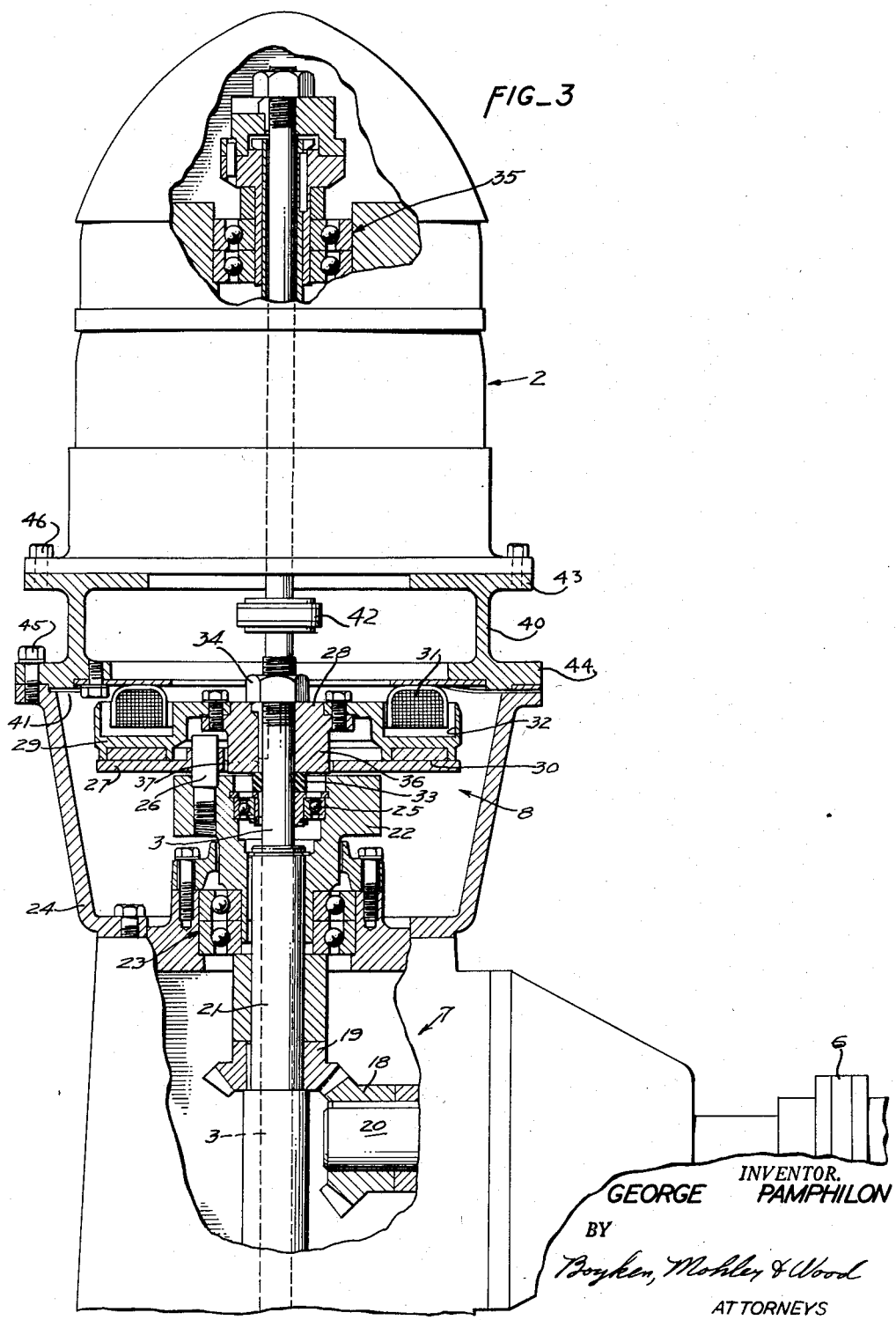

July 12, 1960  G. PAMPHILON  2,944,440
SHAFT DRIVE STRUCTURE
Filed Dec. 31, 1956  3 Sheets-Sheet 3
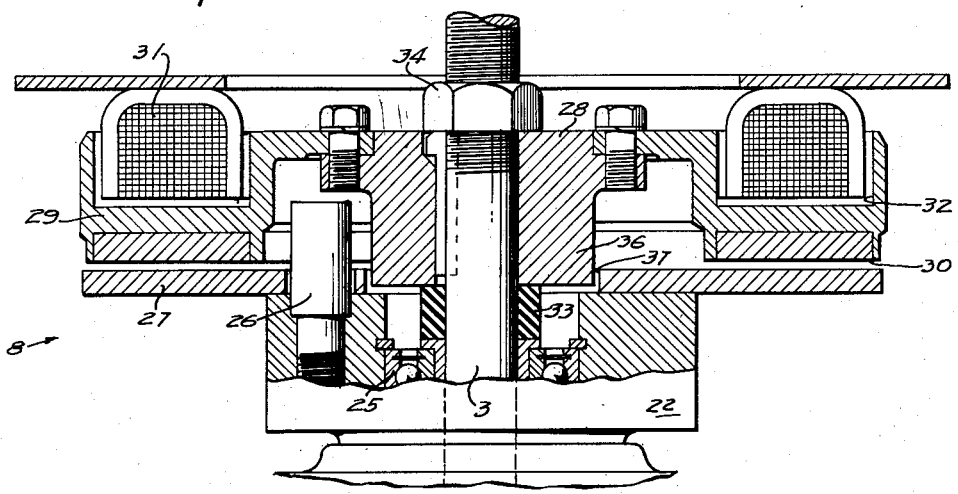
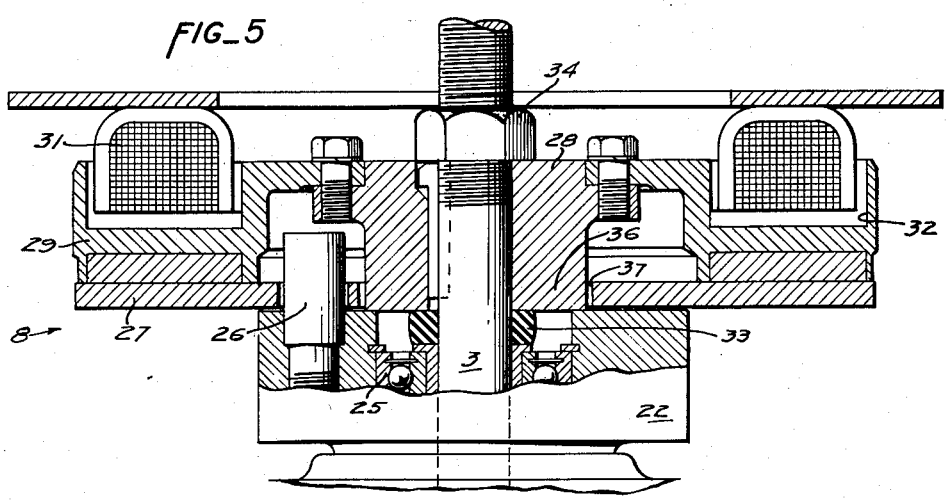
INVENTOR.
GEORGE PAMPHILON
BY
*Boyken, Mohler & Wood*
ATTORNEYS

United States Patent Office 2,944,440
Patented July 12, 1960

2,944,440

SHAFT DRIVE STRUCTURE

George Pamphilon, El Cerrito, Calif., assignor to Johnson Gear & Manufacturing Co., Ltd.

Filed Dec. 31, 1956, Ser. No. 631,637

9 Claims. (Cl. 74—665)

This invention relates to shaft drive structure and more particularly to a clutch mechanism for use in a combination drive installation.

In various installations, such as pumping stations and the like, in which a pump, for example, must operate without substantial interruption, two prime movers are situated to drive the pump sequentially. Conventionally, an electric motor is directly connected to the pump shaft and serves as the primary motive source. For emergency operation, in the event of electric power failure, a standby engine of the gasoline or diesel type with an automatic starter is usually provided to be clutched into driving the pump shaft.

Heretofore mechanical clutches of the centrifugal or overrunning type have been used to couple the standby engine to the pump shaft. These clutches suffer from two principal disadvantages. In the first place, in such an installation in the presence of moisture and corrosive gases mechanical clutches are especially subject to rust and corrosion. Since the standby engines are only infrequently in operation it is not uncommon for these clutches to become so corroded that they will fail to transmit the necessary emergency power to the pump shaft.

Furthermore, with these types of mechanical clutches it is not possible to operate the engine, for purposes of tuning it and the like, at any higher than idling speed without interfering with the normal operation of the electric motor. Hence, the standby engine must be disconnected, if it is desired to run it up to speed at no load, which sacrifices its immediate availability in the event of an emergency. It is also characteristic of mechanical clutches that they must be accurately aligned in order to effectively operate.

It is also conventional practice to mount the electric drive motor and the pump shaft in a vertical position so that the pump downthrust is carried by the motor thrust bearing. In the event of failure of this thrust bearing or removal of the motor for repairs the pump may be severely damaged unless provision is made for taking up this pump thrust load. This invention contemplates not only making such a provision but also incorporates associated means for easily adjusting the pump clearances.

It is therefore an object of this invention to provide means eliminating the above described disadvantages of prior art combination drive units.

Another object of this invention is the provision of an improved clutch mechanism for use in a combination drive unit wherein two prime movers are adapted to sequentially drive a rotary load such as a pump.

Still another object of this invention is the provision of means in a motor-engine combination pump drive for transferring the pump thrust load from the motor thrust bearing in the event of failure or removal of such bearing.

It is yet another object of this invention to provide simplified means for adjusting clearances in a combination motor-engine pump drive unit.

Other objects and advantages will become apparent from the following description taken in connection with the accompanying drawings in which:

Fig. 1 is a semi-schematic view on a reduced scale of the combination drive unit of this invention;

Fig. 2 is a schematic diagram showing the main elements of the automatic controls for the unit of Fig. 1;

Fig. 3 is an enlarged, side elevational view of the motor and right angle drive of the unit of Fig. 1, partly broken away to show internal structural details, and in a position in which the engine is driving;

Fig. 4 is a greatly enlarged sectional view of the clutch mechanism, similar to Fig. 3, but shown in a position in which the motor is driving; and, Fig. 5 is a sectional view similar to Fig. 4 but in which the engine is driving under conditions of failure or removal of the motor thrust bearing.

This invention is concerned generally with a combination drive assembly for driving a pump 1 (Fig. 1), or the like, which is intended to run on a substantially full time basis or be available for immediate and sustained use. Such an assembly conventionally comprises an electric motor, generally designated 2, which is directly connected to the pump drive shaft 3 and disposed in vertical alignment therewith, and a source of standby power, such as a gasoline, natural gas, or diesel engine 4. Engine 4 is normally mounted with its drive shaft 5 extending horizontally and connected through a flexible coupling 6 to a right angle drive, generally designated 7, to be later described.

One half of the right angle drive assembly 7 is mounted coaxially with pump shaft 3 and the power from engine 4 is adapted to be clutched in to drive the pump when necessary. For this purpose the novel clutch of this invention, generally designated 8 (Fig. 1), is provided.

The purpose of the structure generally described thus far is to provide an auxiliary source of power in engine 4 for driving pump 1 in the event of an electricity failure to the motor 2. The schematic diagram of Fig. 2 illustrates not only the parts of the assembly thus far described but also their relation to each other to perform the above function. For this purpose engine 4 is of the self-starting type and is provided with a starting battery 9 and a conventional stop-start control 10. The electric power line 11 is connected through a motor control unit 12 to the electric motor 2. A power failure relay 13 is connected between motor control 12 and engine control 10 for signaling said engine control when the power to motor 2 fails. Under such conditions the engine control 10 will start engine 4 to drive the pump. Actually, it is desirable to provide a time delay relay in engine control 10 to avoid starting in the event that the power failure to the motor is of a very short duration.

Engine control 10 also includes an interlock with the motor control 12 so that the pressure switch or similar device which normally controls the electric motor, in the case of intermittent operation, will instead cause the engine 4 to start and stop if electric power for the motor is not available. Control 10 should also include engine protection devices, such as an "anti-dieseling" device if the engine is gasoline or natural gas powered. A time delay relay may likewise be provided to assure that the return of electric power to motor is steady before stopping the engine 4. These are conventional in controls such as are illustrated and described in catalogs and brochures published by Custom Built Controls of Denver, Colorado, King-Knight Company of San Francisco, California, and Synchro-Start Product, Inc. of Skokie (Chicago), Illinois.

The control for engaging the clutch 8 is also included in engine control 10 and is shown connected to said clutch by means of line 14 in which is placed a switch 15. The purpose of switch 15 is to permit running engine 4 independently of the drive of pump 1 so that said engine may be periodically tuned up and the like.

Referring to Fig. 3 in which the electric motor 2 and right angle drive 7 are illustrated, it is seen that said drive comprises a pair of meshed bevel gears 18, 19. Gear 18 is secured to the end of a horizontal shaft 20 which is connected at its opposite end to flexible coupling 6 and thereby to engine 4. Gear 19 is secured to a sleeve 21 mounted on pump shaft 3 and permitted to freely rotate with respect thereto. Pump shaft 3 is directly connected to electric motor 2, as previously described.

Secured to the upper end of sleeve 21 for rotation therewith, is an annular clutch hub 22. Hub 22 is supported for rotation in relatively large thrust bearings 23 which are mounted in the housing 24 of the clutch and right angle drive. A smaller guide bearing 25, in which shaft 3 is journalled, is provided in the inner bore of the upper portion of hub 22.

Clutch hub 22 is provided with a plurality of upwardly projecting pins 26 which project through complementary holes in an annular clutch plate 27. Said clutch plate is adapted to move axially with relation to shaft 3 but always rotates with clutch hub 22 because of the connection to pins 26. In its disengaged or inoperative position (Fig. 4) clutch plate 27 is adapted to rest on the upper surface of clutch hub 22.

Secured to pump shaft 3 for rotation therewith generally above clutch plate 27 is a rotor hub 28 which is provided with an annular rotor 29 secured thereto. Hub 28 and rotor 29 rotate with shaft 3 at all times and said rotor is provided with a downwardly directed face 30 which is spaced from the upper surface of clutch plate 27 when the clutch is disengaged (Fig. 4). A stationary field coil 31 (Fig. 3) is secured to the housing 24 and projects into an upwardly directed annular groove 32 in rotor 29. Field coil 31 is connected by line 14 (Fig. 2) to the engine control unit 10 which supplies power to energize said field coil. The power so supplied by unit 10 is provided by the engine 4 ignition circuit, including the battery 9, as shown to be conventional by the aforementioned catalogs and brochures.

Energization of field coil causes a magnetic flux to be generated in rotor 29 which attracts clutch plate 27 upwardly (Fig. 3) so that its upper surface is in frictional engagement with the downwardly directed face 30 of said rotor. As previously explained, clutch plate 27 is free to move up and down between the two positions shown in Figs. 3 and 4. Rotor hub 28 and its associated rotor 29 are positioned on shaft 3 between a compressible spacer 33, which rests on top of guide bearing 25, and a nut 34 which engages the upper surface of rotor hub 28 and is threadedly received on the head shaft 3 of the pump. The clearance between stationary field 31 and rotor 29 may be adjusted by means of nut 34. Likewise, the clearance between rotor 29 and clutch plate 27 (Fig. 4) may be adjusted to the preferable gap of from $\frac{1}{16}$ to $\frac{3}{32}$ of an inch.

The pump downthrust caused by the weight of the pump impeller and drive shaft 3 are normally carried by the main motor thrust bearing 35 (Fig. 3). Hence, under normal operation, spacer 33 will be in a uncompressed condition as shown in Figs. 3, 4. It will be noted however that a portion 36 of rotor hub 28 projects downwardly through a central circular opening 37 in clutch plate 27 to a position spaced slightly above the upper surface of clutch hub 22. The spacing between the lower surface of portion 36 of hub 28 and the upwardly directed surface of clutch hub 22 is slightly less than the normal gap between clutch plate 27 and rotor 29. Hence, when a predetermined load is placed on rotor hub 28 by shaft 3 that is sufficient to compress spacer 33 (Fig. 5) the portion 36 of said rotor hub will rest on clutch hub 22.

Under normal operating conditions electric motor 2 drives pump 1 through its direct connection to shaft 3. The relationship of the parts of clutch 8 under this condition is shown in Fig. 4 in which there is a gap between clutch plate 27 and rotor 29 because field coil 31 is deenergized. Although rotor hub 28 and rotor 29 rotate with shaft 3 there is no connection under these circumstances with any of the parts below rotor 29 which are connected to the engine 4. Hence, engine 4 may be operated at any speed for the purpose of testing it or the like without interference with the normal driving operation of the pump by the electric motor 2, when switch 15 is open.

In the event of failure of power to electric motor 2, the power failure relay 13 signals the engine control 10 which in turn initiates the starting of engine 4 and likewise energizes field coil 31 after the appropriate time delay. It will be noted that switch 15 is normally closed but may be opened when it is desired to run engine 4 without energizing field coil 31. Engine 4 drives bevel gears 18, 19 through shaft 5, flexible coupling 6, and shaft 20, and gear 19 causes rotation of sleeve 21 and clutch hub 22. Through its engagement with pins 26 hub 22 drives clutch plate 27.

As previously explained, the energization of field coil 31 attracts clutch plate 27 into frictional engagement with rotor 29 so that said clutch plate drives said rotor which in turn drives pump shaft 3 through rotor hub 28. This condition in which the engine is driving the pump during a mere failure of power to electric motor 2 is illustrated in Fig. 3 in which it will be noted that the thrust load of the pump is still carried on the motor thrust bearings 35. The adjustment of head nut 34 need not be disturbed during this change over from the electric motor drive to the engine drive.

However, in the event that thrust bearing 35 in the motor 2 fails or such motor need be removed for repairs and the like, it is still possible, with the device of this invention, to operate the pump on engine 4 alone. Under such conditions, illustrated in Fig. 5, the thrust load of the pump will pull shaft 3 downwardly so that the lower portion 36 of rotor hub 28 rests on the upper surface of clutch hub 22. This of course compresses washer 33 and instead of carrying the pump thrust load on the small drive bearing 25 such load is transferred through clutch hub 22 to the large thrust bearings 23 (Fig. 3) in the right angle drive. The operation of clutch 8 is similar to that previously described in that clutch plate 27 is drawn into frictional engagement with the rotor 29 by the magnetic flux created by field coil 31. When the engine 4 is driving the pump under conditions illustrated in Fig. 5 it may be necessary that head nut 34 be tightened down in order to raise shaft 3 slightly to provide a free running clearance of the pump runner.

It will be noted that guide bearing 25 is protected against overload under these conditions by the provision of rotor hub 28 resting on the lower clutch hub 22 caused by the compression of spacer 33. Thrust bearings 23 are fully capable of carrying the pump thrust load and the pump may be continuously driven by engine 4 under these conditions.

Since pins 26, received in bushings in plate 27, provide the only mechanical connection in the clutch mechanism 8, the chances of corrosion fouling said clutch are relatively slight because the pins and bushings which receive them are made of non-corrosive material. Not only is the clutch mechanism of this invention substantially simplified over prior art clutches for like usage, but there is no need to carefully align this clutch as with previously used mechanical clutches.

It is important to note that one size of this clutch will perform acceptably at any speed from zero to full speed, unlike most mechanical clutches which are restricted to a small speed range for each size of clutch.

The use of a centrifugal clutch, for instance, may substantially restrict the effective speed range of the unit whereas the clutch of this invention is capable of operating throughout a broad speed range.

Another important feature of this invention is the provision of the motor stand 40 which supports the motor 2 above the clutch housing 24. Since motor housings are provided in different sizes and of different constructions by different manufacturers, any attempt to modify the upper portion of clutch housing 24 for the purpose of directly mounting the motor thereon would meet with several obstacles.

In the first place, it is desirable that the opening 41 in the top of housing 24 be sufficiently large to permit unrestricted access to the clutch mechanism 8 for assembly and like purposes. If the top of the housing 24 had to be modified to fit different motor housing mountings, such modification would almost necessarily restrict the size of this top opening.

Furthermore, different methods of connection of the motor to the pump shaft are commonly used. Some types of connections include couplings, such as is shown at 42, which may vary in height and therefore require more or less spacing between the bottom of the motor housing and the clutch assembly 8. To modify clutch housing 24 to accommodate each or all of these various conditions would obviously be a costly solution as well as providing unnecessary complications.

The motor stand 40 provided by this invention solves the above mentioned problems by the simplest and most direct means. Such stand is preferably cylindrical in shape and hollow, and is provided with flanges 43, 44 at its upper and lower ends, respectively. It will be understood that the diameter and height of stand 40 may vary according to the particular application but that flange 44 will be of a constant size to be connected to the top of housing 24, as by bolts 45. The top of motor stand 40 will be fitted to the mounting characteristics of the particular motor for which it is designed and flange 43 is adapted to be secured to the motor housing flange by bolts 46 or the like.

Although the invention has been described and illustrated in detail it is intended that modifications therein that would appear to be desirable to a person skilled in the art should be included within the spirit and scope of the following claims.

I claim:

1. In a right angle gear drive that includes a vertical drive shaft having power means at its upper end portion for driving the same, and a hollow shaft coaxial with said drive shaft enclosing an intermediate portion of said drive shaft and in which said drive shaft is rotatable and vertically movable, an upper main thrust bearing above said power means supporting said drive shaft at its upper end, a lower thrust bearing below said power means supporting said hollow shaft and a pair of normally disconnected elements between said upper thrust bearing and said lower thrust bearing respectively connected with said drive shaft and with said hollow shaft, means for connecting said elements in driving relation with each other whereby said vertical shaft and said hollow shaft may be rotated as a unit, and means between said bearings for supporting the weight of said drive shaft on said lower thrust bearing in the event of the removal of said upper thrust bearing or failure of the latter.

2. In a right angle gear drive that includes a vertical drive shaft having power means at its upper end portion for driving the same, and a hollow shaft coaxial with said drive shaft enclosing an intermediate portion of said drive shaft and in which said drive shaft is rotatable and vertically movable, an upper main thrust bearing above said power means supporting said drive shaft at its upper end, a lower thrust bearing below said power means supporting said hollow shaft and a pair of normally disengaged clutch elements between said upper thrust bearing and said lower thrust bearing respectively connected with said drive shaft and with said hollow shaft, one of said clutch elements being actuatable for movement into driving engagement with the other whereby said vertical shaft and said hollow shaft may be rotated as a unit, and means between said bearings for supporting the weight of said drive shaft on said lower thrust bearing in the event of the removal of said upper thrust bearing or failure of the latter, a support connected with said hollow shaft for supporting said one of said clutch elements, and said last mentioned means including said support.

3. In a right angle gear drive that includes a vertical drive shaft having power means at its upper end portion for driving the same, and a hollow shaft coaxial with said drive shaft enclosing an intermediate portion of said drive shaft and in which said drive shaft is rotatable and vertically movable, an upper main thrust bearing above said power means supporting said drive shaft at its upper end, a lower thrust bearing below said power means supporting said hollow shaft and a pair of normally disengaged clutch elements between said upper thrust bearing and said lower thrust bearing respectively connected with said drive shaft and with said hollow shaft, one of said clutch elements being actuatable for movement into driving engagement with the other whereby said vertical shaft and said hollow shaft may be rotated as a unit, and means between said bearings for supporting the weight of said drive shaft on said lower thrust bearing in the event of the removal of said upper thrust bearing or failure of the latter, yieldable means yieldably holding said clutch elements spaced apart a predetermined distance and movable means on said vertical shaft in engagement with one of said clutch elements for adjusting the spacing between said clutch elements.

4. In a right angle gear drive that includes a vertical drive shaft having a first power means connected with its upper end portion for driving the same, and a hollow shaft coaxial with said drive shaft disposed below said upper end portion within which said drive shaft is rotatable, a horizontal shaft below said first power means, a pair of meshed bevel gears respectively secured on said hollow shaft and on said horizontal shaft, and a second power means connected with said horizontal shaft; a pair of vertically spaced clutch elements coaxial with said drive shaft disposed between said first power means and said pair of gears respectively connected with said drive shaft and with said hollow shaft, and actuatable for movement from said spaced position to driving engagement, a first main thrust bearing above said first power means supporting said drive shaft for rotation, a second thrust bearing supporting said hollow shaft for rotation, means on said drive shaft and on said hollow shaft for supporting said drive shaft from said second thrust bearing upon removal of the support of said first main thrust bearing.

5. In a right angle gear drive that includes a vertical drive shaft having a first power means connected with its upper end portion for driving the same, and a hollow shaft coaxial with said drive shaft disposed below said upper end portion within which said drive shaft is rotatable, a horizontal shaft below said first power means, a pair of meshed bevel gears respectively secured on said hollow shaft and on said horizontal shaft, and a second power means connected with said horizontal shaft; a pair of vertically spaced clutch elements coaxial with said drive shaft disposed between said first power means and said pair of gears respectively connected with said drive shaft and with said hollow shaft, and actuatable for movement from said spaced position to driving engagement, a first main thrust bearing above said first power means supporting said drive shaft for rotation, a second thrust bearing supporting said hollow shaft for rotation, means on said drive shaft and on said hollow shaft for supporting said drive shaft from said second thrust bearing upon removal of the support of said first main thrust bearing, clutch supporting means respectively supporting said clutch elements on said drive shaft and on said hollow shaft, said means on said drive shaft and on said hollow shaft for supporting said drive shaft from said second thrust bearing including said clutch supporting means.

6. In a combination drive assembly for a pump including a vertically disposed electric motor directly connected to the pump shaft and a horizontally disposed auxiliary power unit adapted to drive the pump shaft in the event of power failure to the motor, means for connecting said power unit to said pump shaft, comprising: a rotor secured to said pump shaft for rotation therewith, a hub supported for rotation relative to said pump shaft and coaxial therewith, means for spacing said rotor from said hub, means connecting said hub to said power unit for rotation therewith, a clutch plate mounted for axial movement between said plate for rotation together, magnetic means associated with said rotor for attracting said clutch plate into driving engagement with said rotor, a thrust bearing supporting said hub for rotation, and said spacing means being compressible to allow said rotor to engage said hub for transferring a predetermined load on said rotor to said hub and thereby to said thrust bearing.

7. In combination in a right angle gear drive; a hollow vertical shaft and a horizontal shaft, a pair of meshed beveled gears with one gear of said pair secured to said hollow shaft and with the other gear secured to said horizontal shaft, a vertical drive shaft rotatable within said hollow shaft and projecting from opposite ends thereof and connected to a load, a first power means spaced above said one gear directly connected with said drive shaft for rotating the latter for driving said load and providing means for supporting the thrust load on said drive shaft, a second power means connected with said horizontal shaft for rotating it and for thereby rotating said hollow shaft, a pair of clutch elements respectively connected with said drive shaft and with said hollow shaft for movement of one element of said pair from an inoperative position out of driving relation with the other into driving engagement with said other element, and electrically actuatable means associated with said elements for causing said movement whereby said load will be driven by said second power means when said elements are in said driving engagement.

8. A combination drive structure comprising: a drive shaft connected to a torque and thrust load, a first prime mover directly connected to said shaft for driving said torque load and providing means supporting said shaft and such thrust load, a rotor connected to said shaft for rotation therewith and having an axially directed planar face, a second prime mover, a clutch plate connected to said second prime mover for rotation therewith and presenting a planar surface to said rotor face, means supporting said rotor in spaced relation to said plate, and magnetic means associated with said rotor for attracting said planar surface of said plate into driving engagement with said rotor upon energization of said magnetic means.

9. A combination drive structure comprising: a drive shaft connected to a torque and thrust load, a first prime mover directly connected to said shaft for driving said torque load and providing means supporting said shaft and such thrust load, a rotor connected to said shaft for rotation therewith and having an axially directed planar face, a second prime mover, a clutch plate connected to said second prime mover for rotation therewith and presenting a planar surface to said rotor face, means supporting said rotor in spaced relation to said plate, magnetic means associated with said rotor for attracting said planar surface of said plate into driving engagement with said rotor upon energization of said magnetic means, starting control means associated with said second prime mover for starting the same and including means connected to said magnetic means for energizing the same.

References Cited in the file of this patent

UNITED STATES PATENTS

| 786,421 | Cutler | Apr. 4, 1905 |
| 2,184,032 | Allen | Dec. 19, 1939 |
| 2,366,734 | Lear | Jan. 9, 1945 |